Patented Nov. 15, 1938

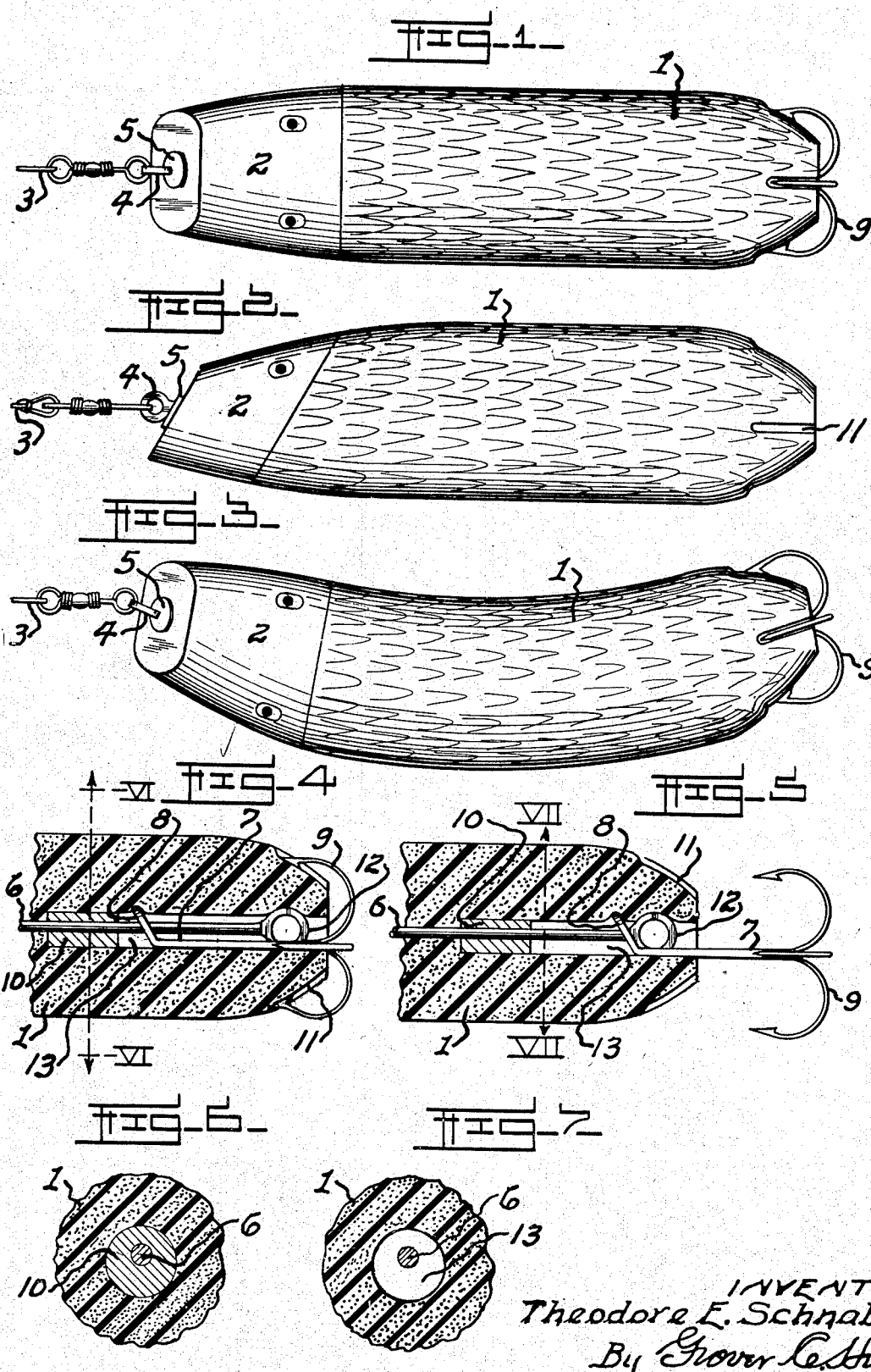

2,136,713

UNITED STATES PATENT OFFICE 2,136,713

WEED-RESISTING FISH LURE

Theodore E. Schnabel, Detroit, Mich.

Application April 28, 1938, Serial No. 204,724

1 Claim. (Cl. 43—35)

The art of creating, manufacturing, and marketing artificial fish bait is ever undergoing development, and inventors and engineers alike have devoted much effort in the attempt to produce a satisfactory bait that would resist weeds and undergrowth such as is characteristic to fishing waters, but it appears that in the present period it is not within the scope of the so-called "weedless baits" to accomplish this purpose.

Realizing this urgent need, I have devised and perfected a fish lure that is so constructed and possesses such qualities as to place it in first position as a weed-resisting lure, and in my opinion the weed-resisting qualities of my lure is as near 100 per cent, or in other words perfect as it will ever be possible to accomplish, and to this end I pride myself in fulfilling an important requirement in this outstanding industry.

With the foregoing in mind, it will become readily apparent that the invention possesses further advantages, all of which will be clearly revealed during the course of the following detailed description, illustrated throughout the accompanying drawing, and more fully pointed out in the appended claim.

With reference to the drawing:—

Figure 1 is a top plan view of the complete lure; and Figure 2 is a side elevation thereof.

Figure 3 is a top plan view of a modified form of the complete lure.

Figure 4 is a longitudinal section of the rear portion of the lure through the center thereof, and showing the hooks in a normal position.

Figure 5 is a similar view to that indicated in Figure 4, but showing the hooks in an extended position.

Figure 6 is a transverse section taken upon line VI—VI of Figure 4; and Figure 7 is a similar view taken upon line VII—VII of Figure 5.

Figures 6 and 7 show a partial view of the body of the lure.

The invention comprises an elongated body 1 preferably round in cross section but may consist of any suitable formation of a material equal to sponge rubber being adapted to float.

The greater portion of the exterior of body 1 is finished so as to be representative of the scaly body of a fish, and portion 2 of the exterior surface is designed so as to be representative of the head of a fish for obvious reasons.

The customary line 3 is secured to eyelet 4 with washer 5 where indicated. Rod 6 is provided and eyelet 4 is formed upon one end thereof and said rod passes through the longitudinal axis of body 1 as in Figures 4 and 5, normally remains in this position.

Still referring to Figures 4 and 5 it is clear that rod 7 is provided and has eyelet 8 upon one end thereof, and the opposite end of said rod terminating to conventional hooks 9 as indicated. Weight 10 is fixed with rod 6 where shown so as to counterbalance the device thus retaining the same in an upright position as in Figure 2.

Rod 7 is slidably secured to rod 6 by virtue of eyelet 8 upon the first-named rod, and the outstanding advantage of this particular form of construction is the fact that due to body 1 being composed of soft rubber, and as the fish strikes hooks 9 in the position as indicated in Figure 4 the rubber at this part of said body will readily yield thereby exposing the barb of said hooks and instantly engaging or catching the mouth of the fish, and simultaneous with this action it is only natural that when the fish once caught it will pull in the direction from the bait thereby moving rod 7 to the position as shown in Figure 5. Eyelet 12 is provided upon one end of rod 6 so as to form a suitable stop for the action of rod 7.

In Figure 4 it will be noted that horizontally disposed passage 13 within the rear portion of body 1 is of greater diametrical proportion than that of eyelet 8 so that the rubber of body 1 will exert a pressure upon said eyelet in the normal position of hooks 9 as in Figure 4, and the extended position of said hooks as in Figure 5. In this manner a braking force is constantly exerted upon eyelet 12 at all times in view of the yieldable nature of the material in body 1, consequently hooks 9 will not change from the position as shown in Figure 4 until at such time when attacked by a fish, and will likewise remain in the position as shown in Figure 5 until the fish is dismembered from the hooks whereupon they are manually returned to their normal position in Figure 4.

With particular reference to Figure 3 the modified form of the invention discloses an arcuate formation of body 1, however the operation and advantages of the lure are identical with those of the major form.

Having thus fully described my invention, what I claim as new is:—

In a fish lure a body composed of a resilient, yieldable, floating material, said body having in combination a series of fishing hooks, a rod extending longitudinally through the center of said body, means upon one end of said rod for securing a towing line thereto, counterbalancing means secured to said rod and within said body; an additional rod, an eyelet upon one end of the last-named rod, said eyelet slidably engaging the first-named rod, a passage extending through the rear portion of said body and horizontally within the same, said eyelet moveable within said passage, aforesaid body material constituting means whereby a braking pressure is continually exerted upon said eyelet for retaining aforesaid hooks in contact with said body and also in an extended position with respect to same, and means upon the rear portion of said body for guarding said hooks when they are in contact with said body from engagement with weeds and undergrowth.

THEODORE E. SCHNABEL.